United States Patent
Hsu et al.

(10) Patent No.: US 10,984,288 B2
(45) Date of Patent: Apr. 20, 2021

(54) MALICIOUS SOFTWARE RECOGNITION APPARATUS AND METHOD

(71) Applicant: Institute For Information Industry, Taipei (TW)

(72) Inventors: Wei-Chao Hsu, Taipei (TW); Ying-Tsun Ke, Taipei (TW); Jiann-Liang Chen, Taipei (TW); Yu-Hung Chen, Kaohsiung (TW); Yan-Ju Chen, Keelung (TW)

(73) Assignee: Institute For Information Industry, Taipei (TW)

( * ) Notice: Subject to any disclaimer, the term of this patent is extended or adjusted under 35 U.S.C. 154(b) by 393 days.

(21) Appl. No.: 16/197,353

(22) Filed: Nov. 20, 2018

(65) Prior Publication Data
US 2020/0125896 A1    Apr. 23, 2020

(30) Foreign Application Priority Data
Oct. 19, 2018   (TW) .................................. 107137009

(51) Int. Cl.
*H04L 29/06* (2006.01)
*G06K 9/62* (2006.01)
(Continued)

(52) U.S. Cl.
CPC .......... *G06K 9/6257* (2013.01); *G06F 21/56* (2013.01); *G06N 20/00* (2019.01); *H04L 63/1425* (2013.01)

(58) Field of Classification Search
CPC . H04L 63/1425; G06F 21/566; G06F 21/552; G06F 21/56; G06K 9/6257; G06K 9/6262; G06N 20/00
See application file for complete search history.

(56) References Cited

U.S. PATENT DOCUMENTS

| 10,027,689 B1 | 7/2018 | Rathor et al. |
| 10,169,581 B2 | 1/2019 | Tsao et al. |

(Continued)

FOREIGN PATENT DOCUMENTS

| CN | 105022960 A | 11/2015 |
| TW | 201741924 A | 12/2017 |
| TW | 201807612 A | 3/2018 |

OTHER PUBLICATIONS

Office Action to the corresponding Taiwan Patent Application rendered by the Taiwan Intellectual Property Office (TIPO) on Apr. 17, 2019, 16 pages (including English translation).

*Primary Examiner* — Tri M Tran
(74) *Attorney, Agent, or Firm* — Skaar Ulbrich Macari, P.A.

(57) ABSTRACT

A malicious software recognition apparatus and method are provided. The malicious software recognition apparatus stores a training dataset, which includes a plurality of network flow datasets. Each network flow dataset corresponds to one of a plurality of software categories, and the software categories include a plurality of malicious software categories. The malicious software recognition apparatus tests a malicious software recognition model and learns that a plurality of recognition accuracies of a subset of the malicious software categories are low, determines that an overlap degree of the network flow datasets corresponding to the subset is high, updates the software categories by combining the malicious software categories corresponding to the subset, updates the training dataset by integrating the network flow datasets corresponding to the subset, trains the malicious software recognition model according to the updated training dataset. The trained malicious software recognition model is deployed to the real world.

19 Claims, 4 Drawing Sheets

(51) Int. Cl.
*G06F 21/56* (2013.01)
*G06N 20/00* (2019.01)

(56) References Cited

U.S. PATENT DOCUMENTS

| | | | |
|---|---|---|---|
| 10,325,224 B1 * | 6/2019 | Erenrich | ................ G06N 20/00 |
| 2017/0337374 A1 | 11/2017 | Chen | |
| 2018/0285740 A1 | 10/2018 | Smyth et al. | |
| 2019/0188212 A1 * | 6/2019 | Miller | .................... G06N 7/005 |

\* cited by examiner

MALICIOUS SOFTWARE RECOGNITION APPARATUS AND METHOD

PRIORITY

This application claims priority to Taiwan Patent Application No. 107137009 filed on Oct. 19, 2018, which is hereby incorporated by reference in its entirety.

FIELD

The present invention relates to a malicious software recognition apparatus and method. Specifically, the present invention relates to a malicious software recognition apparatus and method which recognize malicious software categories based on network behaviors and are capable of gradually updating malicious software categories.

BACKGROUND

Network security equipment (e.g., firewalls) which recognizes malicious software programs based on network behaviors (e.g., network flow) is the front-line equipment for establishing an information security environment. This kind of network security equipment needs to analyze and then record network behaviors of various malicious software programs when the malicious software programs communicate with the outside (e.g., communication behaviors with remote servers, network flows). Thereafter, if the network security equipment detects that a software program has an abnormal network behavior (e.g., connecting to an Internet Protocol (IP) address recorded in a black list, establishing a lot of network connections, having a specific network feature recorded in a malicious software database), the software program is considered as a malicious software program and will then be blocked.

This kind of network security equipment cannot obtain system behaviors of a software program (e.g., input/output behaviors, write/read operations, application program interface (API) calls). Hence, this kind of network security equipment determines whether a software program is normal or malicious only based on network behaviors of the software program. However, features of network behaviors are similar, and categories and number of the malicious software programs increase continuously due to variation, segmentation, or re-packaging, so it is extremely difficult to correctly determine whether a software program is normal or malicious and even recognize the categories of the malicious software program. Moreover, if the network communication of a software program is encrypted, this kind of network security equipment cannot recognize the software program because the advanced packet feature of the software program cannot be obtained.

Accordingly, there is an urgent need for a technique that can recognize the categories of the malicious software program based on the network behaviors under the condition that categories and number of the malicious software programs are continuously increasing.

SUMMARY

Provided is a malicious software recognition apparatus. The malicious software recognition apparatus comprises a storage and a processor, wherein the storage is electrically connected to the processor. The storage is configured to store a training dataset and a test dataset, wherein each of the training dataset and the test dataset comprises a plurality of network flow datasets. Each of the network flow datasets corresponds to one of a plurality of software categories, wherein the software categories comprise a plurality of malicious software categories. The processor finds out that a plurality of recognition accuracies of recognizing a subset of the malicious software categories by a malicious software recognition model are lower than a first threshold by testing the malicious software recognition model by the test dataset, determines that an overlap degree of the network flow datasets corresponding to the subset is larger than a second threshold, updates the software categories by combining the malicious software categories corresponding to the subset in response to the determination result that the overlap degree is larger than the second threshold, and updates the training dataset by integrating the network flow datasets corresponding to the subset. The processor trains the malicious software recognition model according to the updated training dataset and obtains an actual recognition result by recognizing an actual network flow dataset by the trained malicious software recognition model.

Also provided is a malicious software recognition method, which is for use in an electronic computing apparatus. The electronic computing apparatus stores a training dataset and a test dataset, wherein each of the training dataset and the test dataset comprises a plurality of network flow datasets. Each of the network flow datasets corresponds to one of a plurality of software categories, wherein the software categories comprise a plurality of malicious software categories. The malicious software recognition method comprises the following steps: (a) finding out that a plurality of recognition accuracies of recognizing a subset of the malicious software categories by a malicious software recognition model are lower than a first threshold by testing the malicious software recognition model by the test dataset, (b) determining that an overlap degree of the network flow datasets corresponding to the subset is larger than a second threshold, (c) updating the software categories by combining the malicious software categories corresponding to the subset in response to the determination result that the overlap degree is larger than the second threshold, (d) updating the training dataset by integrating the network flow datasets corresponding to the subset in response to the determination result that the overlap degree is larger than the second threshold, (e) training the malicious software recognition model by a machine learning algorithm and the updated training dataset, and (f) obtaining an actual recognition result by recognizing an actual network flow dataset by the trained malicious software recognition model.

Generally speaking, the malicious software recognition technology (including the apparatus and the method) utilizes a training dataset to train a malicious software recognition model into the one that is capable of recognizing a normal software category and a plurality of malicious software categories. At the training stage, the malicious software recognition technology provided by the present invention determines whether it is required to combine some malicious software categories and integrate some network flow datasets to re-train the malicious software recognition model based on the recognition accuracies of recognizing the malicious software categories by the malicious software recognition model. Through the aforesaid combination and integration, differences between malicious software categories become more apparent and, hence, the recognition accuracies of recognizing the software categories by the re-trained malicious software recognition model can be improved. After the malicious software recognition model is deployed to the actual network environment, the malicious software recognition technology provided by the present invention can still update the malicious software recognition model based on an actual recognition result.

Through the above operations, the malicious software recognition technology provides a mechanism which gradually learns and trains a malicious software recognition model. For the malicious software categories whose recognition accuracies are low, the malicious software recognition technology of the present invention further determines whether the aforesaid combination and integration have to be performed and whether the malicious software recognition model has to be re-trained to derive a more adaptive one. For the malicious software categories that cannot be classified, the malicious software recognition technology of the present invention further determines whether the aforesaid combination and integration have to be performed, whether the malicious software categories have to be updated, and whether the malicious software recognition model has to be re-trained and, thereby, ensuring that unknown malicious software categories can be detected immediately. After the malicious software recognition model is actually deployed, the malicious software recognition technology will timely update the malicious software recognition model based on the actual recognition result. Therefore, when there are variants or unknown malicious software programs, the malicious software recognition technology of the present invention can update the malicious software recognition model based on the network flow dataset thereof and, thereby, increase the flexibility of the malicious software recognition model. Moreover, since the operations of the malicious software recognition technology of the present invention are based on network flow datasets, the malicious software categories that adopt the encryption technology can also be recognized.

According to the above descriptions, under the condition that the categories and the number of malicious software programs are increasing continuously, the malicious software recognition technology provided herein can still correctly recognize various malicious software categories by updating the malicious software recognition model in time and thereby immediately block various existing or new malicious software programs.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the malicious software recognition apparatus and method will be explained with reference to certain example embodiments thereof. However, these example embodiments are not intended to limit the present invention to any specific example, embodiment, environment, applications, or implementations described in these example embodiments. Therefore, description of these example embodiments is only for purpose of illustration rather than to limit the scope of the present invention.

It shall be appreciated that, in the following embodiments and the attached drawings, elements unrelated to the present invention are omitted from depiction; and dimensions of elements and dimensional proportions among individual elements in the attached drawings are provided only illustration but not to limit the scope of the present invention.

Figure 1A:
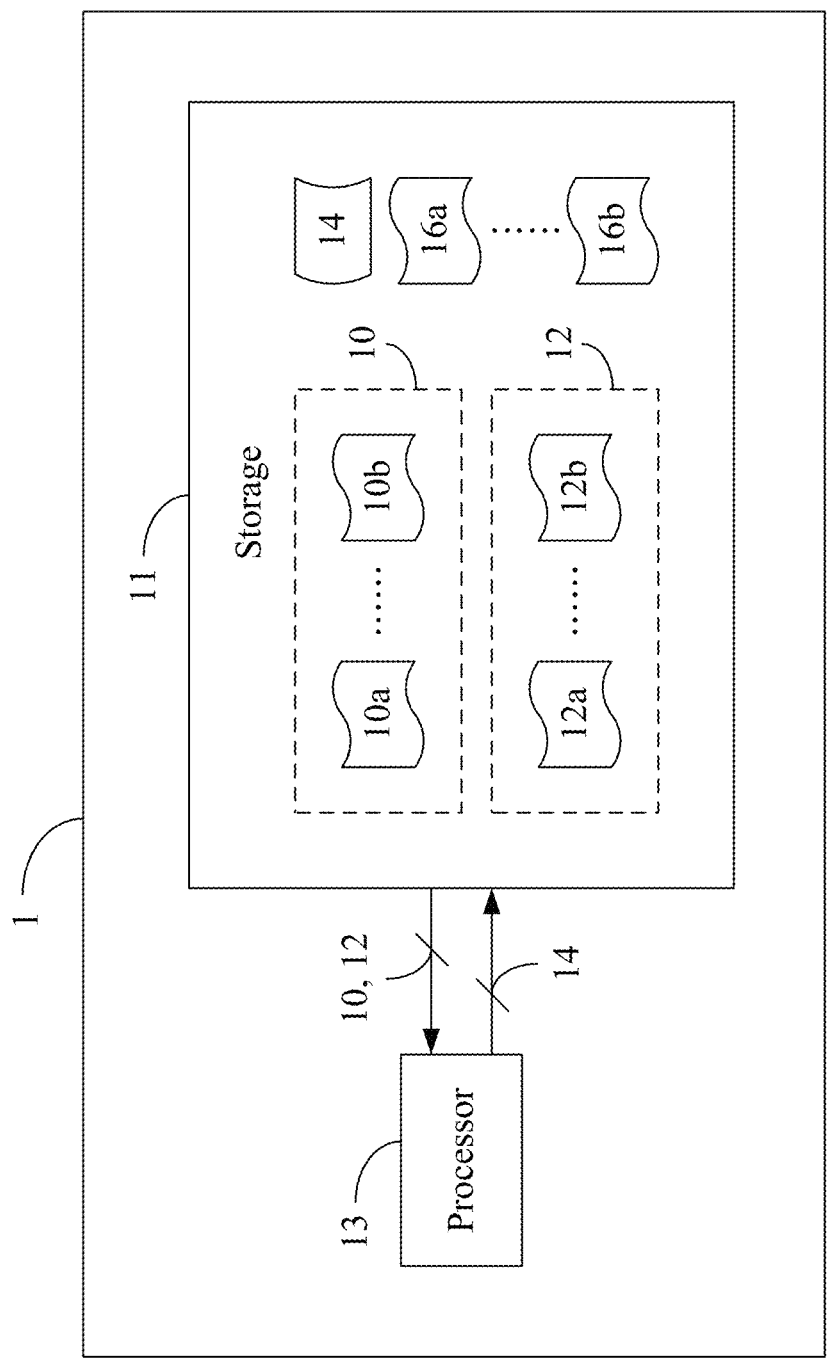
FIG. 1A illustrates a schematic view of a malicious software recognition apparatus 1 according to a first embodiment of the present invention.

A first embodiment of the present invention is a malicious software recognition apparatus 1 and a schematic view of which is illustrated in FIG. 1A. The malicious software recognition apparatus 1 comprises a storage 11 and a processor 13, which are electrically connected with each other. The storage 11 may be a memory, a hard disk drive (HDD), a universal serial bus (USB) disk, a compact disk (CD), or any other non-transitory storage media or apparatuses with the same function and well known to those of ordinary skill in the art. The processor 13 may be one of various processing units, central processing units (CPUs), microprocessors, digital signal processors (DSPs), or any other computing apparatuses with the same function and well known to those of ordinary skill in the art.

The storage 11 stores a training dataset 10 and a test dataset 12. The training dataset 10 comprises a plurality of network flow datasets 10a, . . . , 10b, while the test dataset 12 comprises a plurality of network flow datasets 12a, . . . , 12b. The number of the network flow datasets included in the training dataset 10 may be different to the number of the network flow datasets included in the test dataset 12. Each of the network flow datasets 10a, . . . , 10b and 12a, . . . , 12b corresponds to one of a plurality of software categories (e.g., 100 software categories), wherein each of the network flow datasets 10a, . . . , 10b and 12a, . . . , 12b comprises a plurality of network flow data of the corresponding software category. In this embodiment, a plurality of network flow data included in a network flow dataset (i.e., any one of the aforesaid network flow datasets 10a, . . . , 10b and 12a, . . . , 12b) are data derived from converting a plurality of feature data capable of presenting network behaviors (for example but not limited thereto, a source Internet Protocol (IP) address, a destination IP address, a start time, an end time, a communication protocol name, a destination port number, a flow amount, the number of packets) to a multi-dimensional data space. For comprehension, please refer to the three network flow datasets 18a, 18b, and 18c illustrated in FIG. 1B, which, however, is not intended to limit the scope of the present invention.

The aforesaid software categories comprise a plurality of malicious software categories and may further comprise a normal software category. For convenience, it is assumed that there are 100 software categories at an initial stage (i.e., a stage where a malicious software recognition model has not been trained), wherein one (e.g., the first software category) of them is a normal software category and the other 99 (e.g., the second to the $100^{th}$ software categories) of them are malicious software categories. Please note that the aforesaid total number of software categories and the aforesaid number assigned to each of the normal/malicious software categories are only examples and are not intended to limit the scope of the present invention.

In this embodiment, at the initial stage, each of the malicious software categories comprises only one specific malicious software program and different malicious software categories comprise different specific malicious software programs. In other embodiments, at the initial stage, each of the malicious software categories may comprise more than one specific malicious software program and the network behaviors of the specific malicious software programs in the same malicious software category must be similar (e.g., an overlap degree of the network flow datasets of the specific malicious software programs in the same malicious software category is larger than a preset threshold). Moreover, in this embodiment, in order to obtain better results in the subsequent training and testing, the network flow datasets 10*a*, . . . , 10*b* included in the training dataset 10 cover all the software categories, and the network flow datasets 12*a*, . . . , 12*b* included in the test dataset 12 cover all the software categories.

In this embodiment, the processor 13 trains a malicious software recognition model 14 by the training dataset 10, tests the malicious software recognition model 14 by the test dataset 12, and then determines whether to re-train the malicious software recognition model 14 according to the test result.

Specifically, the processor 13 trains the malicious software recognition model 14 for recognizing the aforesaid software categories (e.g., 100 software categories) by the training dataset 10 and a machine learning algorithm. A person of ordinary skill in the art will be able to appreciate that different machine learning algorithms correspond to different machine learning models. The processor 13 uses the network flow datasets 10*a*, . . . , 10*b* included in the training dataset 10 to train a machine learning model corresponding to the adopted machine learning algorithm and then derives the malicious software recognition model 14.

For example, the machine learning model may be a neural network model, a convolutional neural network model, a logistic regression model, a multiclass decision forest model, but is not limited thereto. A person of ordinary skill in the art should be familiar with the details of the machine learning algorithm and, thus, should be understand how the processor 13 uses the training dataset 10 and the machine learning algorithm to train the malicious software recognition model 14. Therefore, the details of the training will not be further described herein.

Next, the processor 13 uses the network flow datasets 12*a*, . . . , 12*b* included in the test dataset 12 to test the malicious software recognition model 14 and derives a plurality of first recognition accuracies of recognizing the software categories (including the aforesaid one normal software category and the 99 malicious software categories) by the malicious software recognition model 14. If the processor 13 finds out that the first recognition accuracies of the malicious software categories are all greater than a first threshold, it means that the malicious software recognition model 14 passes the test and the software programs are appropriately categorized by the software categories. Hence, the malicious software recognition model 14 may be deployed in an actual network environment.

If the processor 13 tests the malicious software recognition model 14 by the test dataset 12 and then finds out that the first recognition accuracies of recognizing a subset of the malicious software categories (e.g., the first recognition accuracies of the $17^{th}$ software category and the $23^{rd}$ software category among the 99 malicious software categories) by the malicious software recognition model 14 are lower than the first threshold, the processor 13 analyzes the network flow datasets corresponding to the malicious software categories included in the subset and then decides how to re-train the malicious software recognition model 14 according to the result of the analysis.

Specifically, the processor 13 determines whether an overlap degree of the network flow datasets corresponding to the malicious software categories included in the subset is greater than a second threshold. Please note that the second threshold may the same as the aforesaid preset threshold. If the overlap degree of the network flow datasets corresponding to the malicious software categories included in the subset is greater than the second threshold, it means that the network behaviors of the malicious software categories included in the subset are similar and these malicious software categories should be treated as one malicious software category. Therefore, if the overlap degree of the network flow datasets corresponding to the malicious software categories included in the subset is greater than the second threshold, the processor 13 updates the software categories by combining the malicious software categories corresponding to the subset (i.e., treating the malicious software categories corresponding to the subset as one malicious software category) and updates the training dataset 10 by integrating the network flow datasets corresponding to the subset.

In different embodiments of the present invention, the malicious software recognition apparatus 1 may adopt the following different ways to update the training dataset 10 by integrating the network flow datasets corresponding to the malicious software categories included in the subset. For convenience, it is assumed that the subset comprises a first malicious software category and a second malicious software category (e.g., the $17^{th}$ malicious software category and the $23^{rd}$ malicious software category among the 99 malicious software categories).

Figure 1B:
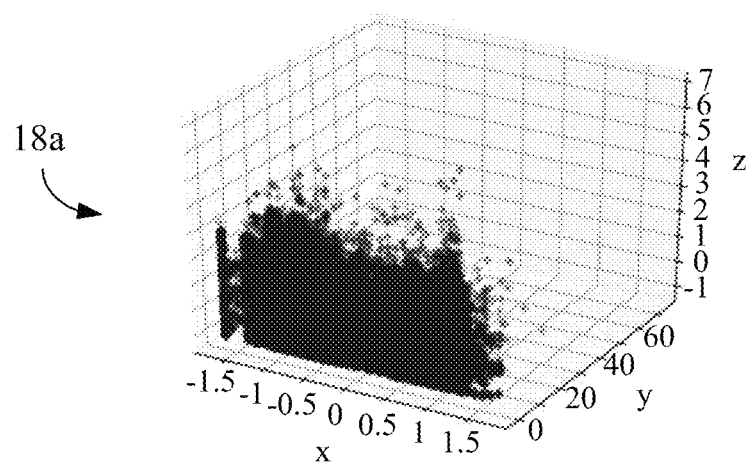
FIG. 1B illustrates a specific example of a network flow dataset.
Figure 1B:
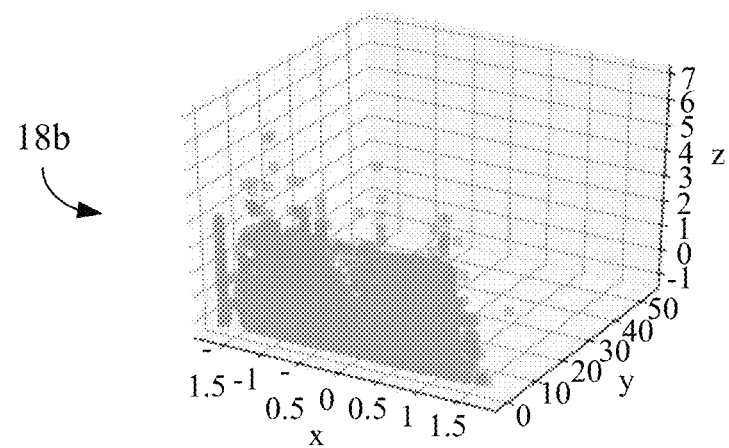
Figure 1B:
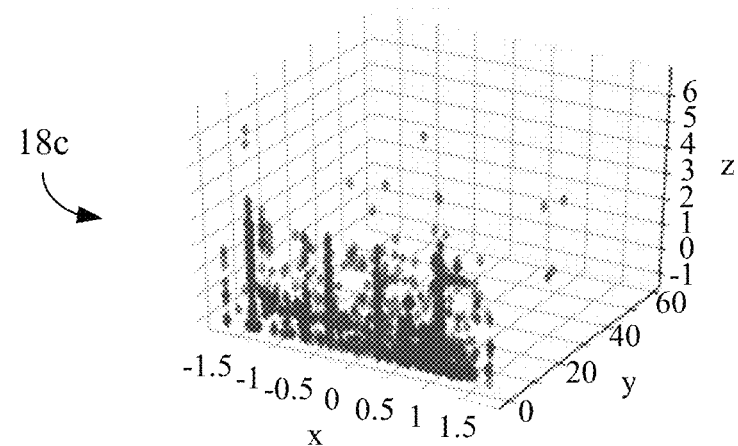

In some embodiments, when there is a need in updating the training dataset 10 by integrating the network flow datasets corresponding to the malicious software categories included in the subset so as to update the training dataset 10, the processor 13 integrates the network flow datasets corresponding to the subset by taking a union of the network flow datasets corresponding to the first malicious software category and the network flow datasets corresponding to the second malicious software category. For comprehension, an example based on the network flow datasets 18*a* and 18*c* shown in FIG. 1B is given herein. It is assumed that the network flow dataset 18*a* is the network flow dataset corresponding to the first malicious software category and the network flow dataset 18*c* is the network flow dataset corresponding to the second malicious software category. The processor 13 integrates the network flow datasets corresponding to the subset by taking the union of the network flow dataset 18*a* corresponding to the first malicious software category and the network flow dataset 18*c* corresponding to the second malicious software category.

In some embodiments, when there is a need in updating the training dataset 10 by integrating the network flow datasets corresponding to the malicious software categories included in the subset, the processor 13 retains the network flow datasets corresponding to the first malicious software category and discards the network flow datasets corresponding to the second malicious software category (or, retains the network flow datasets corresponding to the second malicious software category and discards the network flow datasets corresponding to the first malicious software category).

For comprehension, an example based on the network flow datasets 18*a* and 18*b* shown in FIG. 1B is given herein. It is assumed that the network flow dataset 18*a* is the network flow dataset corresponding to the first malicious software category and the network flow dataset 18*b* is the network flow dataset corresponding to the second malicious software category. The processor 13 determines that a coverage of the network flow dataset 18*a* corresponding to the first malicious software category is larger than a coverage of the network flow dataset 18*b* corresponding to the second malicious software category, so the processor 13 retains the network flow dataset 18*a* corresponding to the first malicious software category and discards the network flow dataset 18*b* corresponding to the second malicious software category.

In some embodiments, the processor 13 decides which of the aforesaid manners to be adopted for to integrating the network flow datasets corresponding to the subset by setting up two thresholds. Specifically, the processor 13 sets up an upper threshold and a lower threshold, wherein the upper threshold is higher than the lower threshold. If the processor 13 determines that the overlap degree of the network flow datasets corresponding to the first malicious software category and the network flow datasets corresponding to the second malicious software category is between the upper threshold and the lower threshold, the processor 13 integrates the network flow datasets corresponding to the subset by taking a union of the network flow datasets corresponding to the first malicious software category and the network flow datasets corresponding to the second malicious software category. If the processor 13 determines that the overlap degree of the network flow datasets corresponding to the first malicious software category and the network flow datasets corresponding to the second malicious software category is higher than the upper threshold, the processor 13 retains the network flow datasets corresponding to the first malicious software category and discards the network flow datasets corresponding to the second malicious software category (or, retains the network flow datasets corresponding to the second malicious software category and discards the network flow datasets corresponding to the first malicious software category).

The above description is based on the example that there is one subset and the subset comprises two malicious software categories (i.e., the aforesaid first malicious software category and the second malicious software category). For the situation that a subset comprises more than two malicious software categories, the operations that the processor 13 has to perform to determine the overlap degree of the network flow datasets of the malicious software categories and the operations that the processor 13 has to perform to update the training dataset 10 by integrating the network flow dataset corresponding to the malicious software categories included in the subset shall be appreciated by those of ordinary skill in the art based on the aforesaid description and, thus, will not be further described herein. Moreover, for the situation that there are more than one subset (i.e. there are several subsets whose first recognition accuracies are lower than the first threshold), the processor 13 will analyze these subsets one by one to determine whether it is necessary to update the software categories and update the training dataset 10. The details shall be appreciated by those of ordinary skill in the art based on the above description and, thus, will not be further described herein.

After updating the training dataset 10 and updating the software categories (e.g., combining the 17$^{th}$ malicious software category and the 23$^{rd}$ malicious software category into the same malicious software category so that the number of the software categories is updated from 100 to 99), the processor 13 re-trains the malicious software recognition model 14 by the updated training dataset 10 and the aforesaid machine learning algorithm.

In some embodiments, the malicious software recognition apparatus 1 considers that the re-trained malicious software recognition model 14 passes the test and the updated software categories are appropriate, so this re-trained malicious software recognition model 14 may be deployed in an actual network environment.

In some embodiments, the processor 13 further tests the re-trained malicious software recognition model 14 by the test dataset 12, which results in a plurality of recognition accuracies of recognizing the updated software categories by the re-trained malicious software recognition model 14. If the test result shows that the recognition accuracies of some software categories are lower than the first threshold, the processor 13 then determines whether it is necessary to combine some malicious software categories and integrate some network flow datasets to re-train the malicious software recognition model 14. In these embodiments, the processor 13 will repeat the aforesaid operations until the recognition accuracies of recognizing all the software categories by the trained malicious software recognition model 14 are all higher than the first threshold. Until then, the processor 13 consider that the malicious software recognition model 14 passes the test and the software categories are appropriate, so the malicious software recognition model 14 may be deployed in an actual network environment.

After the malicious software recognition model 14 passes the test and is deployed in the actual network environment, the processor 13 obtains an actual recognition result (not shown) by recognizing an actual network flow dataset (not shown) by the malicious software recognition model 14. The actual recognition result shows to which software category that the actual network flow dataset corresponds to. If the actual recognition result is a specific malicious software category (i.e., a certain malicious software category among these software categories), the processor 13 will block an application program corresponding to the actual network flow dataset.

In some embodiments, the malicious software recognition apparatus 1 may further determine whether to update the malicious software recognition model 14 according to the actual recognition result. In these embodiments, if the actual recognition result is a specific malicious software category (i.e., a certain malicious software category among these software categories), the processor 13 will make the aforesaid determination according to a second recognition accuracy of recognizing the specific malicious software category by the malicious software recognition model 14.

Specifically, the processor 13 may make the aforesaid determination by setting up a third threshold and a fourth threshold, wherein the fourth threshold is higher than the third threshold. If the processor 13 determines that the second recognition accuracy is higher than the fourth threshold, it means that the current malicious software recognition model 14 can correctly recognize malicious software and the current software categories are appropriately defined. Hence, it is unnecessary to update the malicious software recognition model 14. If the processor 13 determines that the second recognition accuracy is between the third threshold and the fourth threshold, it means that the actual network flow dataset may come from a variational malicious software category and this variational malicious software category and some existing malicious software category belong to the same family. Therefore, the processor 13 may adopt any of the aforesaid manners to update the training dataset 10 by integrating the network flow datasets corresponding to the specific malicious software category and the actual network flow dataset and re-train the malicious software recognition model 14 by the updated training dataset 10. If the processor 13 determines that the second recognition accuracy is lower than the third threshold, it means that the actual network flow dataset may come from a new malicious software category. Therefore, the processor 13 updates the software categories by adding the new malicious software category and trains a sub-recognition model in the malicious software recognition model 14 that corresponds to the new malicious software category by the actual network flow dataset.

In some embodiments, the malicious software recognition apparatus 1 may further provide a flow behavior related report. In these embodiments, the storage 11 further stores a plurality of flow behavior related reports 16a, . . . , 16b, wherein each of the flow behavior related reports 16a, . . . , 16b corresponds to one of the malicious software categories. During the process of training the malicious software recognition model 14, the processor 13 will combine some flow behavior related reports under some situation. Specifically, if the processor 13 determines that the malicious software categories corresponding to a certain subset need to be combined, the flow behavior related reports corresponding to the malicious software categories included in the subset will also be combined.

After the malicious software recognition model 14 passes the test and is deployed in the actual network environment, if the malicious software recognition model 14 determines that the actual recognition result of an actual network flow data is a specific malicious software category, the processor 13 will retrieve an actual flow behavior related report from the flow behavior related reports 16a, . . . , 16b stored in the storage 11 according to the specific malicious software category. The user can thus take necessary actions according to the actual flow behavior related report.

According to the above descriptions, the malicious software recognition apparatus 1 utilizes the training dataset 10 to train the malicious software recognition model 14 that is capable of recognizing a normal software category and a plurality of malicious software categories. At the training stage, the malicious software recognition apparatus 1 determines whether it is required to combine some malicious software categories and integrate some network flow datasets (i.e., combine some malicious software categories that have similar network behaviors into one malicious software category and integrate the corresponding network flow datasets) to re-train the malicious software recognition model 14 based on the recognition accuracies of recognizing the malicious software categories by the malicious software recognition model 14. Through the aforesaid combination and integration, differences between different malicious software categories become more apparent and, hence, the recognition accuracies of recognizing the software categories by the re-trained malicious software recognition model 14 can be improved. After the malicious software recognition model 14 passes the test and is deployed to the actual network environment, the malicious software recognition apparatus 1 can still update the malicious software recognition model 14 based on the actual recognition result. Through the aforesaid operations, even under the condition that the categories and the number of the malicious software are increasing continuously, the malicious software recognition apparatus 1 can still correctly recognize various malicious software categories by updating the malicious software recognition model 14 in time and thereby immediately block various existing or new malicious software.

Figure 2A:
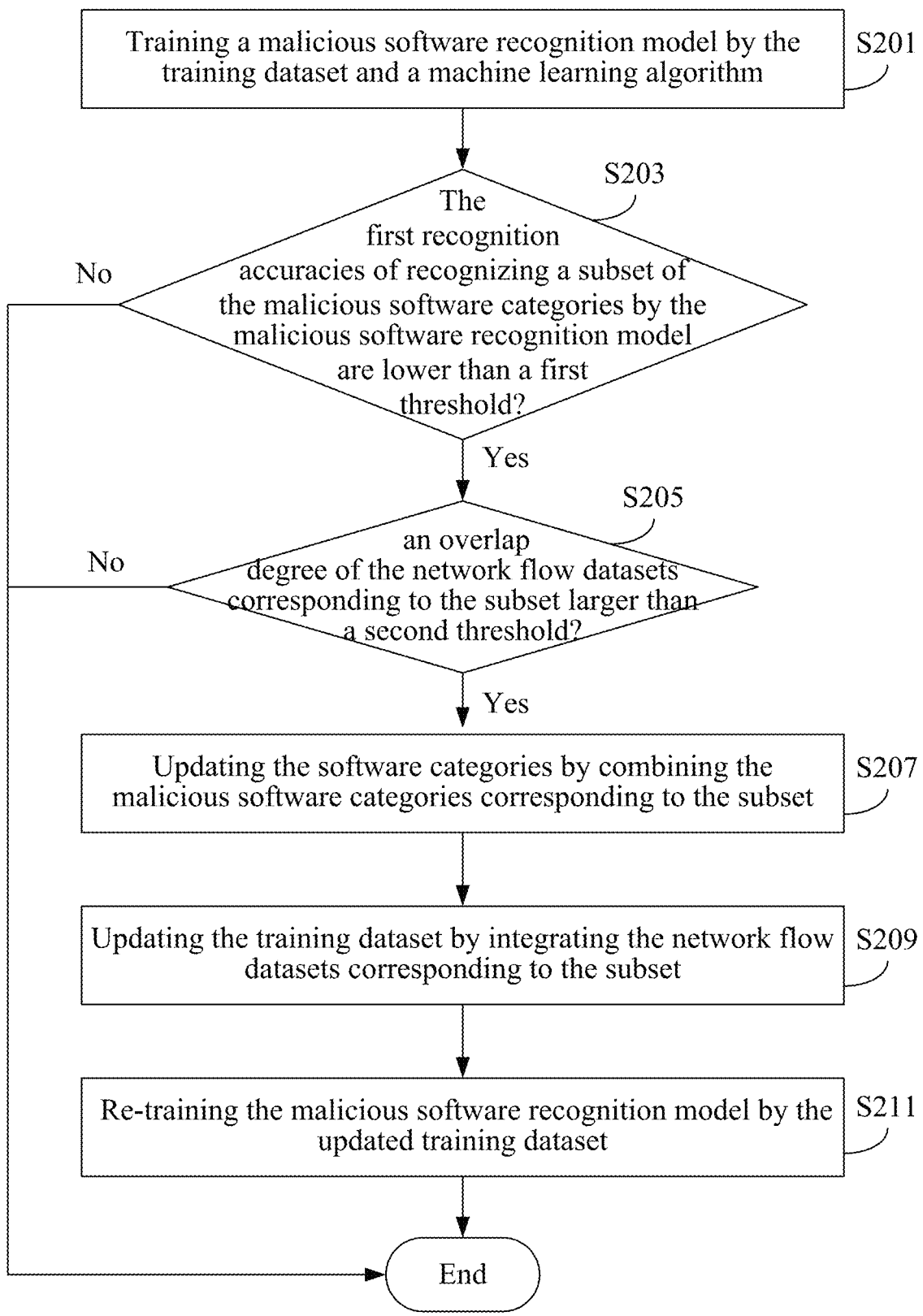
FIG. 2A illustrates a flowchart of a malicious software recognition method according to a second embodiment of the present invention.

A second embodiment of the present invention is a malicious software recognition method and a flowchart of which is illustrated in FIG. 2A. The malicious software recognition method is for use in an electronic computing apparatus (i.e., may be executed by the electronic computing apparatus, e.g., the malicious software recognition apparatus 1 in the first embodiment). The electronic computing apparatus stores a training dataset and a test dataset, wherein each of the training dataset and the test dataset comprises a plurality of network flow datasets. Each of the network flow datasets corresponds to one of a plurality of software categories, wherein the software categories comprise a normal software category and a plurality of malicious software categories. At an initial stage (i.e., a stage where a malicious software recognition model has not been trained), each of the malicious software categories comprises only one specific malicious software program and different malicious software categories comprise different specific malicious software programs.

In step S201, the electronic computing apparatus trains a malicious software recognition model by the training dataset and a machine learning algorithm. In step S203, the electronic computing apparatus finds out whether a plurality of first recognition accuracies of recognizing a subset of the malicious software categories by the malicious software recognition model are lower than a first threshold by testing malicious software recognition model by the test dataset. If the determination result of the step S203 is no, it means that the malicious software recognition model passes the test and, hence, the training process can be ended.

If the determination result of the step S203 is yes, step S205 will be executed by the electronic computing apparatus to determine whether an overlap degree of the network flow datasets corresponding to the subset is larger than a second threshold. If the determination result of the step S205 is no, it means that no network flow dataset needs to be integrated and the training process can be ended. If the determination result of the step S205 is yes, step S207 will be executed by the electronic computing apparatus to update the software categories by combining the malicious software categories corresponding to the subset. In step S209, the electronic computing apparatus updates the training dataset by integrating the network flow datasets corresponding to the subset. It shall be appreciated that the order for executing the steps S207 and S209 is not limited in the present invention. In other words, the step S207 may be executed before or after the step S209, or the step S207 and the step S209 may be executed simultaneously.

In some embodiments, the subset comprises a first malicious software category and a second malicious software category. The step S205 determines whether an overlap degree of the network flow datasets corresponding to the first malicious software category and the network flow datasets corresponding to the second malicious software category is greater than the second threshold. The step S209 updates the training dataset by retaining the network flow datasets corresponding to the first malicious software category and discarding the network flow datasets corresponding to the second malicious software category. In some embodiments, the step S209 updates the training dataset by taking a union of the network flow datasets corresponding to the first malicious software category and the network flow datasets corresponding to the second malicious software category.

Thereafter, in step S211, the electronic computing apparatus re-trains the malicious software recognition model by the updated training dataset. In some embodiments, the malicious software recognition method considers that the malicious software recognition model re-trained in the step S211 passes the test and the software categories updated in the step S207 are appropriate. Hence, the re-trained malicious software recognition model can be deployed in an actual network environment.

In some embodiments, the malicious software recognition method may again use the test dataset to test the re-trained malicious software recognition model, which results in a plurality of recognition accuracies of recognizing the updated software categories by the re-trained malicious software recognition model. If the test result shows that the recognition accuracies of some software categories are lower than the first threshold, the malicious software recognition method then determines whether it is necessary to re-combine some malicious software categories and integrate some network flow datasets to re-train the malicious software recognition model. In these embodiments, the malicious software recognition method repeats the aforesaid steps until the recognition accuracies of recognizing the software categories by the trained malicious software recognition model are all higher than the first threshold. Until then, the malicious software recognition method considers that the malicious software recognition model passes the test, the software categories are appropriate, and the malicious software recognition model may be deployed in an actual network environment.

Figure 2B:
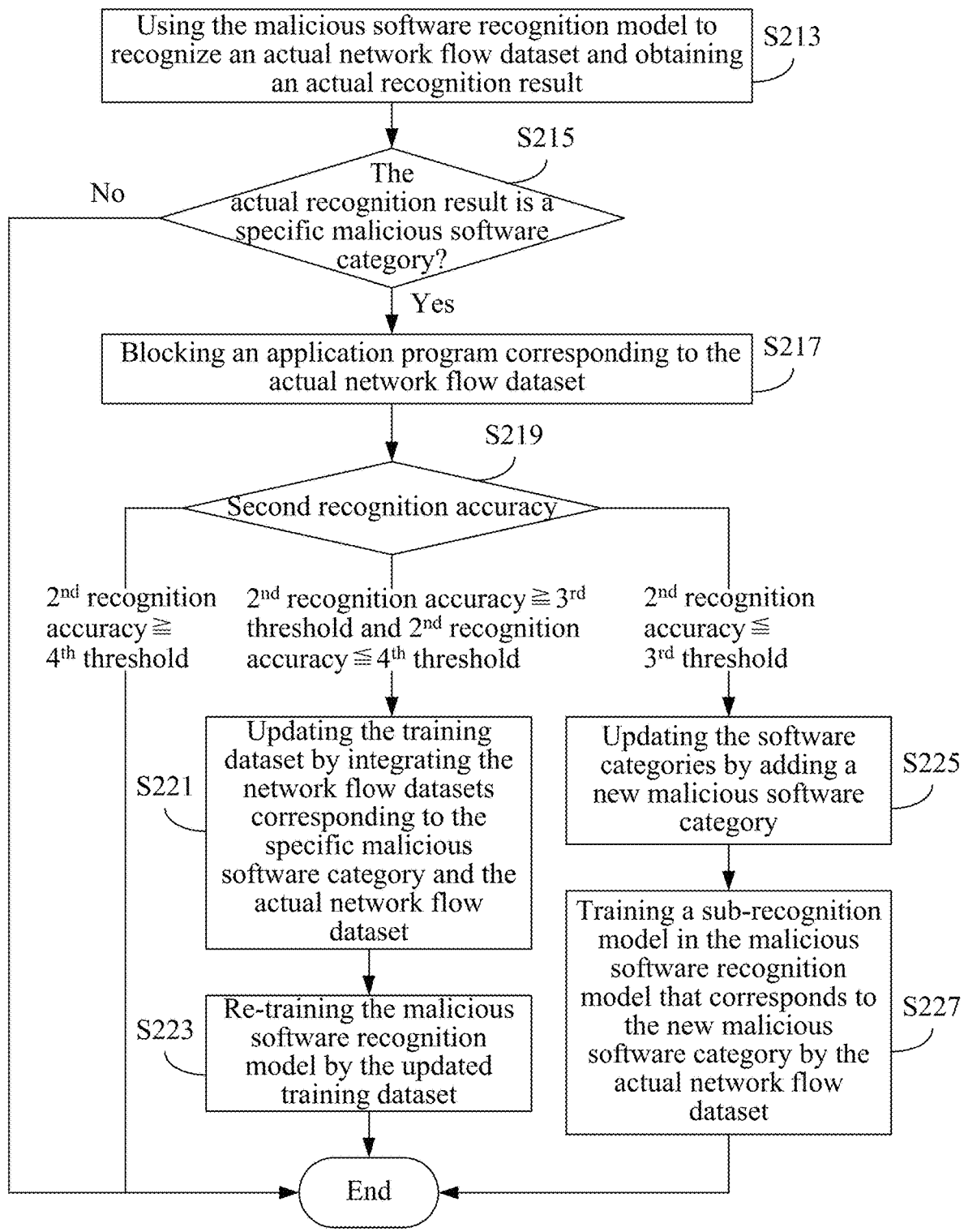
FIG. 2B illustrates a partial flowchart of a malicious software recognition method according to some embodiments of the present invention.

In some embodiments, the malicious software recognition method may further execute the procedure as shown in FIG. 2B. In step S213, the electronic computing apparatus uses the malicious software recognition model that has passed the test (e.g., the malicious software recognition model obtained in the step S211) to recognize an actual network flow dataset and then obtains an actual recognition result.

In some embodiments, the malicious software recognition method further executes steps S215 to S227 to update the malicious software recognition model based on the actual recognition result.

In step S215, the electronic computing apparatus determines whether the actual recognition result is a specific malicious software category (i.e., a certain malicious software category in the software categories). If the determination result of the step S215 is no, it means that the recognition result is a normal software category and, hence, the malicious software recognition method can end this procedure. If the determination result of the step S215 is yes, step S217 is executed by the electronic computing apparatus to block an application program corresponding to the actual network flow dataset.

In some embodiments, if the step S215 determines that the actual recognition result is a specific malicious software category (i.e., a certain malicious software category in the software categories), the malicious software recognition method further executes step S219 to enable the electronic computing apparatus to perform further determination according to a second recognition accuracy of recognizing the specific malicious software category by the malicious software recognition model. Specifically, the malicious software recognition method utilizes a third threshold and a fourth threshold, wherein the fourth threshold is higher than the third threshold.

If the malicious software recognition method determines that the second recognition accuracy is higher than the fourth threshold, it means that the current malicious software categories are appropriate. Therefore, the malicious software recognition method ends this procedure. If the malicious software recognition method determines that the second recognition accuracy is between a third threshold and a fourth threshold, steps S221 and S223 will be executed and the procedure will be ended afterwards. In step S221, the electronic computing apparatus updates the training dataset by integrating the network flow datasets corresponding to the specific malicious software category and the actual network flow dataset. In step S223, the electronic computing apparatus re-trains the malicious software recognition model by the updated training dataset. If the malicious software recognition method determines that the second recognition accuracy is lower than the third threshold, steps S225 and S227 will be executed and then the procedure will be ended afterwards. In step S225, the electronic computing apparatus updates the software categories by adding a new malicious software category. In step S227, the electronic computing apparatus trains a sub-recognition model in the malicious software recognition model that corresponds to the new malicious software category by the actual network flow dataset.

In some embodiments, malicious software recognition method may further provide flow behavior related reports. In these embodiments, the electronic computing apparatus further stores a plurality of flow behavior related reports, wherein each of the flow behavior related reports corresponds to one of the malicious software categories. In these embodiments, during the process of training the malicious software recognition model, the malicious software recognition method will combine some flow behavior related reports under some situation. Specifically, if the malicious software categories corresponding to a certain subset are combined in the step S207, the malicious software recognition method will execute another step to combine the flow behavior related reports corresponding to the malicious software categories that correspond to the subset.

In these embodiments, after the malicious software recognition model passes the test and is deployed in the actual network environment, if the actual recognition result of the step S213 is a specific malicious software category, the malicious software recognition method further executes a step to retrieve an actual flow behavior related report from the flow behavior related reports according to the specific malicious software category.

In addition to the aforesaid steps, the second embodiment can execute all the operations and steps of the malicious software recognition apparatus 1 set forth in the first embodiment, have the same functions, and deliver the same technical effects as the first embodiment. How the second embodiment executes these operations and steps, has the same functions, and delivers the same technical effects as the first embodiment will be readily appreciated by those of ordinary skill in the art based on the explanation of the first embodiment and, thus, will not be further described herein.

It shall be appreciated that, in the specification and the claims of this patent application, some words (including threshold, malicious software category, recognition accuracy) are preceded by the terms such as "first," "second," "third," or "fourth." Please note that the terms of "first," "second," "third," and "fourth" are only used to distinguish these words.

According to the above descriptions, the malicious software recognition technology (at least including the apparatus and the method) provided by the present invention utilizes a training dataset to train a malicious software recognition model that is capable of recognizing a normal software category and a plurality of malicious software categories. No matter at the training stage or the actual using stage, the malicious software recognition technology provided by the present invention determines whether it is required to combine some malicious software categories and integrate some network flow datasets to re-train the malicious software recognition model when some recognition accuracies of the malicious software recognition model are low. Through the aforesaid combination and integration, differences between different malicious software categories become more apparent, so the recognition accuracies of recognizing the software categories by the re-trained malicious software recognition model can be improved.

Through the above operations, the malicious software recognition technology of the present invention provides a mechanism which gradually learns and trains a malicious software recognition model. For the malicious software categories of lower recognition accuracies, the malicious software recognition technology of the present invention further determines whether it is required to perform the aforesaid combination and integration to re-train the malicious software recognition model so that a more adaptive malicious software recognition model can be derived. For the malicious software categories that cannot be classified, the malicious software recognition technology of the present invention further determines whether it is required to perform the aforesaid combination and integration, update the malicious software categories, and re-train the malicious software recognition model, In this way, it is ensured that unknown malicious software categories can be detected immediately.

After the malicious software recognition model is actually deployed, the malicious software recognition technology of the present invention will timely update the malicious software recognition model based on the actual recognition result. Therefore, when there are variants or unknown malicious software programs, the malicious software recognition technology of the present invention can update the malicious software recognition model based on the network flow dataset thereof and thereby increase the flexibility of the malicious software recognition model. Moreover, since the operations of the malicious software recognition technology of the present invention are based on the network flow datasets, the malicious software categories that adopt the encryption technology can also be recognized.

Under the condition that the categories and the number of the malicious software programs are increasing continuously, the malicious software recognition technology provided by the present invention can still correctly recognize various malicious software categories by updating the malicious software recognition model in time and thereby immediately block various existing or new malicious software.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A malicious software recognition apparatus, comprising:
 a hardware storage, being configured to store a training dataset and a test dataset, each of the training dataset and the test dataset comprising a plurality of network flow datasets, each of the network flow datasets corresponding to one of a plurality of software categories, the software categories comprising a plurality of malicious software categories; and
 a processor, being electrically connected to the storage, and configured to find out that a plurality of first recognition accuracies of recognizing a subset of the malicious software categories by a malicious software recognition model are lower than a first threshold by testing the malicious software recognition model by the test dataset, determine that an overlap degree of the network flow datasets corresponding to the subset is larger than a second threshold, update the software categories by combining the malicious software categories corresponding to the subset in response to the determination result that the overlap degree is larger than the second threshold, update the training dataset by integrating the network flow datasets corresponding to the subset, and train the malicious software recognition model according to the updated training dataset;
 wherein the processor further obtains an actual recognition result by recognizing an actual network flow dataset by the trained malicious software recognition model.

2. The malicious software recognition apparatus of claim 1, wherein the subset comprises a first malicious software category and a second malicious software category, the overlap degree being determined as greater than the second threshold by the processor is between the network flow datasets corresponding to the first malicious software category and the network flow datasets corresponding to the second malicious software category, and the processor integrates the network flow datasets corresponding to the subset by performing the following operations: retaining the network flow datasets corresponding to the first malicious software category and discarding the network flow datasets corresponding to the second malicious software category.

3. The malicious software recognition apparatus of claim 1, wherein the subset comprises a first malicious software category and a second malicious software category, the overlap degree being determined as greater than the second threshold by the processor is between the network flow datasets corresponding to the first malicious software category and the network flow datasets corresponding to the second malicious software category, and the processor integrates the network flow datasets corresponding to the subset by taking a union of the network flow datasets corresponding to the first malicious software category and the network flow datasets corresponding to the second malicious software category.

4. The malicious software recognition apparatus of claim 1, wherein the actual recognition result comprises a specific malicious software category and a second recognition accuracy, the specific malicious software category is one of the malicious software categories, the second recognition accuracy is between a third threshold and a fourth threshold, the processor further updates the training dataset by integrating the network flow datasets corresponding to the specific malicious software category and the actual network flow dataset, and the processor further trains the malicious software recognition model by the updated training dataset.

5. The malicious software recognition apparatus of claim 1, wherein the actual recognition result comprises a specific malicious software category and a second recognition accuracy, the specific malicious software category is one of the malicious software categories, the second recognition accuracy is lower than a third threshold, the processor updates the software categories by adding a new malicious software category, and the processor further trains a sub-recognition model in the malicious software recognition model that corresponds to the new malicious software category by the actual network flow dataset.

6. The malicious software recognition apparatus of claim 1, wherein the storage further stores a flow behavior related report corresponding to each of the malicious software categories.

7. The malicious software recognition apparatus of claim 6, wherein the actual recognition result comprises a specific malicious software category, the specific malicious software category is one of the malicious software categories, and the processor further retrieves an actual flow behavior related report from the flow behavior related reports according to the specific malicious software category.

8. The malicious software recognition apparatus of claim 6, wherein the processor further combines the flow behavior related reports corresponding to the malicious software categories that correspond to the subset.

9. The malicious software recognition apparatus of claim 1, wherein the actual recognition result comprises a specific malicious software category, and the processor further blocks an application program corresponding to the actual network flow dataset.

10. The malicious software recognition apparatus of claim 1, wherein the software categories further comprise a normal software category.

11. A malicious software recognition method for use in an electronic computing apparatus, the electronic computing apparatus storing a training dataset and a test dataset, each of the training dataset and the test dataset comprising a plurality of network flow datasets, each of the network flow datasets corresponding to one of a plurality of software categories, the software categories comprising a plurality of malicious software categories, and the malicious software recognition method comprising:
  finding out that a plurality of first recognition accuracies of recognizing a subset of the malicious software categories by a malicious software recognition model are lower than a first threshold by testing the malicious software recognition model by the test dataset;
  determining that an overlap degree of the network flow datasets corresponding to the subset is larger than a second threshold;
  updating the software categories by combining the malicious software categories corresponding to the subset in response to the determination result that the overlap degree is larger than the second threshold;
  updating the training dataset by integrating the network flow datasets corresponding to the subset in response to the determination result that the overlap degree is larger than the second threshold;
  training the malicious software recognition model by a machine learning algorithm and the updated training dataset; and
  obtain an actual recognition result by recognizing an actual network flow dataset by the trained malicious software recognition model.

12. The malicious software recognition method of claim 11, wherein the subset comprises a first malicious software category and a second malicious software category, the determining step determines that the overlap degree between the network flow datasets corresponding to the first malicious software category and the network flow datasets corresponding to the second malicious software category is larger than the second threshold, and the step of updating the training dataset by integrating the network flow datasets corresponding to the subset comprises: retaining the network flow datasets corresponding to the first malicious software category; and discarding the network flow datasets corresponding to the second malicious software category.

13. The malicious software recognition method of claim 11, wherein the subset comprises a first malicious software category and a second malicious software category, the determining step determines that the overlap degree between the network flow datasets corresponding to the first malicious software category and the network flow datasets corresponding to the second malicious software category is larger than the second threshold, and the step of updating the training dataset by integrating the network flow datasets corresponding to the subset comprises: taking a union of the network flow datasets corresponding to the first malicious software category and the network flow datasets corresponding to the second malicious software category.

14. The malicious software recognition method of claim 11, wherein the actual recognition result comprises a specific malicious software category and a second recognition accuracy, the specific malicious software category is one of the malicious software categories, the second recognition accuracy is between a third threshold and a fourth threshold, and the malicious software recognition method further comprises:
  updating the training dataset by integrating the network flow datasets corresponding to the specific malicious software category and the actual network flow dataset; and
  re-training the malicious software recognition model by the updated training dataset.

15. The malicious software recognition method of claim 11, wherein the actual recognition result comprises a specific malicious software category and a second recognition accuracy, the specific malicious software category is one of the malicious software categories, the second recognition accuracy is lower than a third threshold, and the malicious software recognition method further comprises: updating the software categories by adding a new malicious software category; and training a sub-recognition model in the malicious software recognition model that corresponds to the new malicious software category by the actual network flow dataset.

16. The malicious software recognition method of claim 11, wherein the electronic computing apparatus further stores a flow behavior related report corresponding to each of the malicious software categories, the actual recognition result comprises a specific malicious software category, the specific malicious software category is one of the malicious software categories, and the malicious software recognition method further comprises: retrieving an actual flow behavior related report from the flow behavior related reports according to the specific malicious software category.

17. The malicious software recognition method of claim 11, wherein the electronic computing apparatus further stores a flow behavior related report corresponding to each of the malicious software categories, and the malicious software recognition method further comprises: combining the flow behavior related reports corresponding to the malicious software categories that correspond to the subset.

18. The malicious software recognition method of claim 11, wherein the actual recognition result comprises a specific malicious software category, and the malicious software recognition method further comprises: blocking an application program corresponding to the actual network flow dataset.

19. The malicious software recognition method of claim 11, wherein the software categories further comprise a normal software category.

\* \* \* \* \*